United States Patent [19]
Wright et al.

[11] 3,739,666
[45] June 19, 1973

[54] TUBE CUTTING HEAD STRUCTURE

[75] Inventors: William Wright, East Syracuse; Myron Mathewson, Syracuse, both of N.Y.

[73] Assignee: Carrier Corporation, Syracuse, N.Y.

[22] Filed: Jan. 17, 1972

[21] Appl. No.: 218,074

[52] U.S. Cl............................ 82/59, 82/2 E, 82/63, 82/71, 82/76
[51] Int. Cl.............................................. B23b 5/14
[58] Field of Search .................. 82/59, 63, 71, 76, 82/2 E

[56] References Cited
UNITED STATES PATENTS
3,129,621 4/1964 Makowski............................. 82/59
2,112,396 3/1938 Corrigan................................ 82/63

Primary Examiner—Leonidas Vlachos
Attorney—Harry G. Martin, Jr. and J. Raymond Curtin

[57] ABSTRACT

A rotary tube cutting head structure has only one movable element in the form of a cutter support carrying a cutter at one side of the tube and having a weighted portion at the opposite side of the tube. Upon rotation of the head, the weighted portion of the support effects movement of the cutter by centrifugal force transversely of the tube to sever the same. Means is provided to yieldingly oppose movement of the cutter support by centrifugal force. There is stop means to limit movement of the cutter toward the tube and also in a direction from the tube. A counterweight is provided to reduce vibration of the head at high speed rotation thereof.

8 Claims, 5 Drawing Figures

INVENTORS
WILLIAM WRIGHT
MYRON MATHEWSON

INVENTOR.
WILLIAM WRIGHT
MYRON MATHEWSON

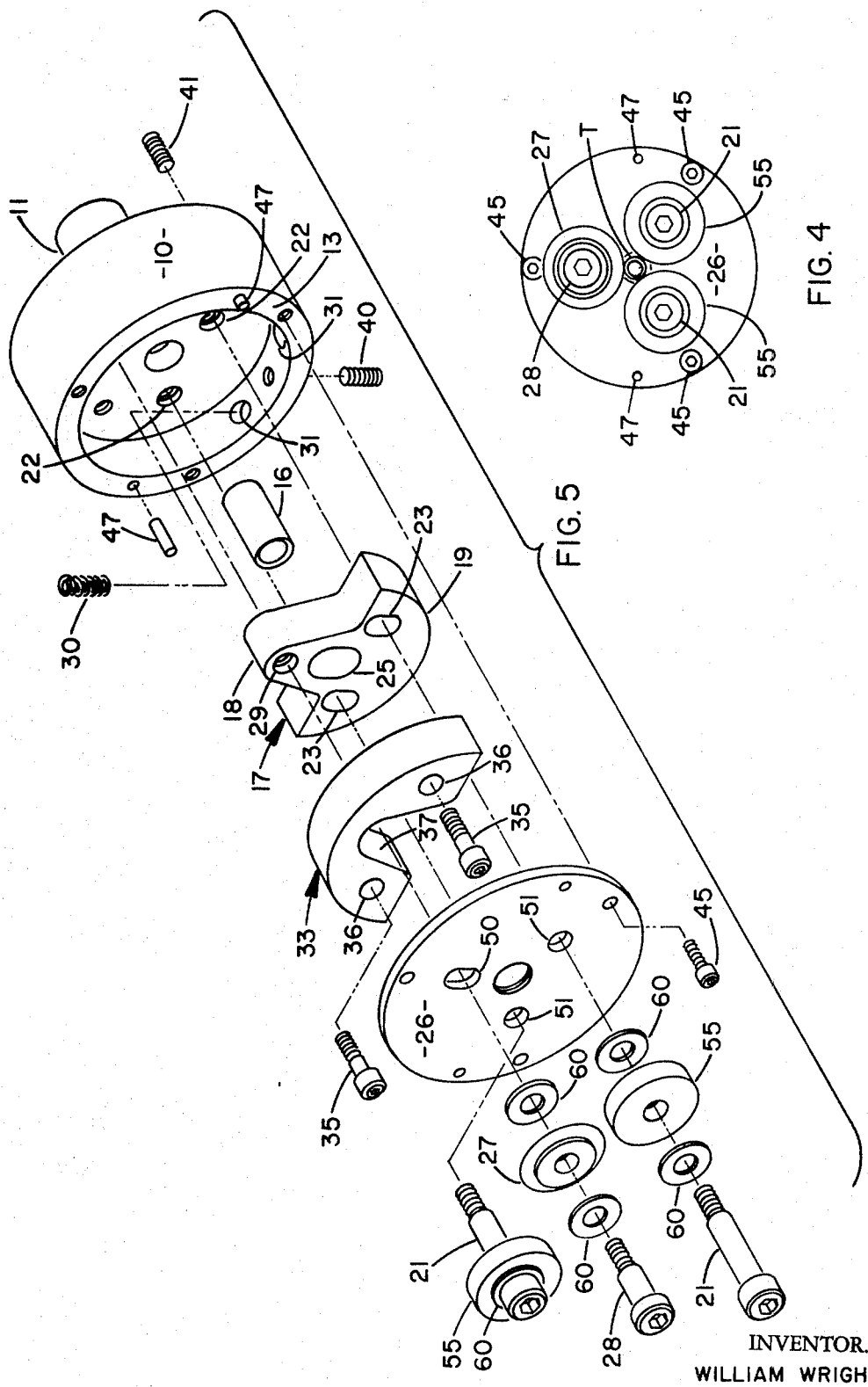

3,739,666

TUBE CUTTING HEAD STRUCTURE

BACKGROUND OF THE INVENTION

Many power operated devices have been produced for cutting tubes and the like. Some such devices include means for moving the cutter into cutting engagement with the tube by the action of centrifugal force. However, such devices embody a large, heavy and complex structure of many parts resulting in high construction and maintenance costs.

The tube cutting device of this invention embodies a particularly simple compact structure including only one moving part in the form of a cutter support to effect severance of the tube whereby the device can be fabricated at low cost and will endure long production runs without maintenance problems.

SUMMARY OF THE INVENTION

A head adapted to be coaxially connected to a rotably driven spindle is formed with a recess in which a cutter support is mounted for sliding movement in a direction transversely of the tube. The support is formed with a weighted portion located at the side of the tube opposite to the side at which the cutter is positioned. Upon rotation of the head member, the weighted cutter support is moved in a direction diametrically of the tube, moving the cutter carried by the support into cutting engagement with the tube.

BRIEF DESCRIPTION OF THE DRAWINGS

FIG. 4 is an end elevation looking to the left of FIG. 2; and

FIG. 5 is a view showing the parts of the device in exploded arrangement.

DESCRIPTION OF THE PREFERRED EMBODIMENT

Figure 1:
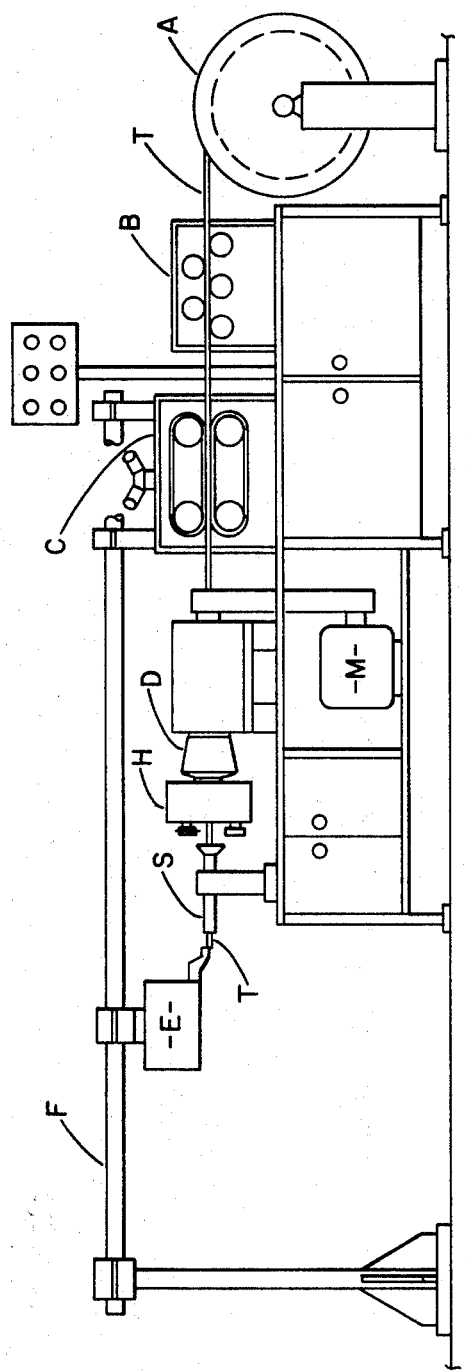
FIG. 1 is a schematic view illustrating the tube processing apparatus in which the tube cutting head structure embodying our invention is incorporated.

Referring to FIG. 1 illustrating the tube processing as a whole, the tubing T is passed from a supply roll A through a tube straightening device B. The tube is advanced by a tube feeding device C, the tube passing through a hollow spindle D through which our cutting head H is attached. The tube is advanced through the cutting head and through a hollow support S into engagement with a limit switch E which is adjustable along a bar F. The position of the switch E determines the length of the severed tube.

When the end of the tube engages the switch E, the spindle D carrying the head H is operatively connected to the motor M by actuation of a clutch in the spindle housing. Also the feed mechanism C is stopped.

Upon severance of the tube by the cutting head H, the spindle D is de-clutched and the tube feed mechanism C is actuated to advance the tube, ejecting the severed piece of tubing from the support S. Upon engagement with the switch E, the operation is repeated. This general arrangement illustrated in FIG. 1 is conventional, our invention residing in the structure of the head H.

Figure 2:
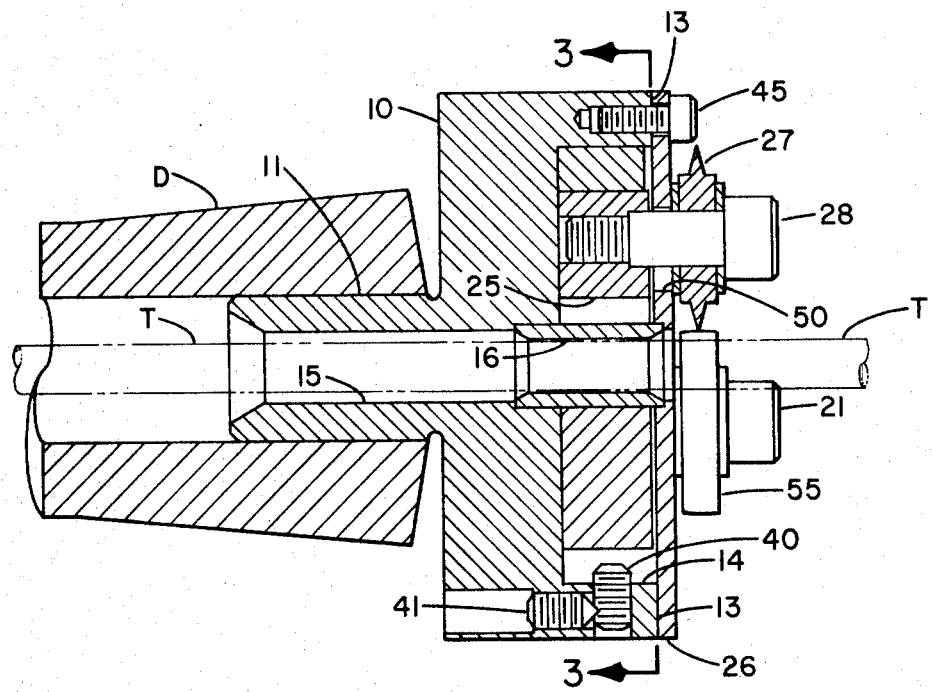
FIG. 2 is a sectional view of the tube cutter embodying our invention, the view corresponding to the line 2—2 on FIG. 3.

The tube cutting head structure consists of a body member formed with a discoidal portion 10 formed with an integral shank 11 for attachment to the rotatable drive spindle D, FIG. 2, to effect rotation of the head about its axis. The opposite side of the discoidal portion is formed with a cylindrical flange 13 forming a circular recess 14 in the head. The body member is formed at its axis with a through aperture 15, the outer end portion of which is counter bored to receive a bushing 16. Preferably the bushing 16 is formed of hard material such as tungsten carbide, and the bore of the bushing is polished for the reception of the tube being cut.

A cutter support is generally indicated at 17, FIG. 5. The cutter support consists of a radially extending arm portion 18, and a semicircular weighted portion 19. As shown in the drawings, particularly FIG. 3, the arm portion 18 of the cutter support is located at one side of the axis of the bushing 16, which, as stated, is positioned coaxially in the head, and in which the tube is positioned during the cutting operation. The weighted portion 19 of the cutter support is located at the opposite side of the axis of the bushing 16 and, accordingly, the axis of the tube.

The cutter support is maintained in position by two shouldered screws 21 threading into holes 22 formed in the discoidal portion 10 of the head. The weighted portion 19 of the cutter support is formed with elongated apertures 23 through which the screws 21 extend, see FIGS. 3 and 5. The cutter support is also formed with an elongated aperture 25 for reception of the bushing 16. With this structure, the support is mounted in the recess 14 between the discoidal portion 10 and a cover disk 26 for sliding movement in a direction transversely of the axis of the bushing 16.

Figure 3:
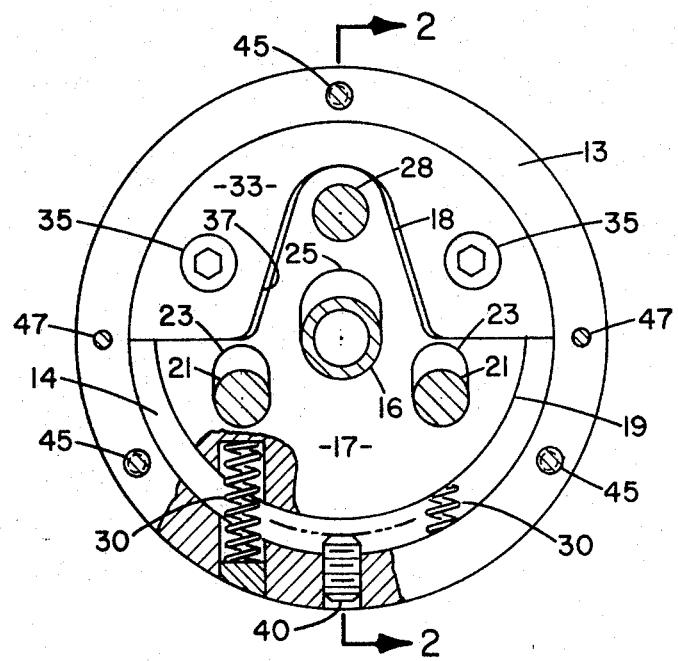
FIG. 3 is a view taken on line 3—3, FIG. 2.

Upon rotation of the head at high speed, the support 17 is moved in a downward direction, making reference to FIG. 3, by centrifugal force in the weighted portion 19, moving the cutter wheel 27 into engagement with a tube T positioned in the bushing 16. The cutter wheel 27 is mounted for free rotation on a shouldered screw 28 threaded in an aperture 29 formed in the arm portion 18 of the support.

A pair of recesses are formed in the periphery of the counterweight portion 19 to receive helical compression springs 30, the opposite end portions of which are positioned in apertures 31 formed in the inner surface of the flange 13, see FIG. 3. The springs 30 exert a yielding force against the cutter support opposing movement thereof by centrifugal force. The movement of the cutter support by the springs 30 is limited by engagement of like ends of the slots 23 with the studs 21 as shown in FIG. 3.

The weighted portion 19 of the cutter support 17 is counterbalanced by a counterweight 33 of semicircular form fixed to the discoidal wall 10 of the head member by screws 35. The screws 35 extend through apertures 36 in the counterweight and thread into the wall 10. The outer ends of the apertures 36 are counter bored to receive the heads of the screws 35 so the same are positioned flush with the outer surface of the counterweight. The counterweight is formed with a central recess 37 to receive the arm portion 18 of the cutter support, see FIGS. 3 and 5.

An adjustable stop means is provided to limit movement of the cutter 27 toward the axis of the tube. This stop means is in the form of a screw 40 threaded through the flange 13 and maintained in adjusted position by a set screw 41, see FIG. 2.

The open end of the recess 14 is closed by the cover disk 26 positioned on the flange 13 and fixed thereto by screws 45. The cover disk is correctly oriented on the head by dowel pins 47. The cover disk is formed with an elongated aperture 50 to receive the stud 28, which projects outwardly from the cover, and on which the cutter 27 is mounted exteriorly of the cover disk 26. The cover is also formed with apertures 51 to receive the cutter support guiding screws 21 which also serve to rotatably support backup rolls 55 which support the tube during the cutting operation by the cutter wheel 27.

The cutter support 17 and the counterweight 33 are substantially the same thickness and are arranged in coplanar relation in the space 14 between the discoidal wall 10 and the cover closure 26. This arrangement provides a compact structure in both radial and axial dimension.

It is believed apparent that with a tube positioned in the bushing 16, as indicated in dotted line at T, FIG. 2, and upon rotation of the body and assembly carried therein, the weighted portion 19 of the support will, by centrifugal action, move the cutter into engagement with tube T and sever the same. Washers 60, formed of anti-friction material, are positioned on each side of the backup rolls 55 and the cutter 27.

While a preferred embodiment of this invention has been described for purposes of illustration, it will be appreciated that this invention may be otherwise embodied within the scope of the following claims.

We claim:

1. A tube cutting head structure comprising a body for attachment to a rotatable drive spindle, said body being formed at one end with an open recess, a cutter support mounted in said recess, a cutter means mounted on said support at one side of a first plane extending diametrically of the axis of rotation of said head, said support being formed with a weighted portion located at the opposite side of said plane, a pair of tube back-up rolls, each of said rolls being journaled on a roll support fixedly secured to said head, roll supports being located in an area at the opposite side of said first plane and being positioned at opposite sides of a second plane extending diametrically of the axis of said head and perpendicular to said first plane, said head being formed at the axis thereof with an aperture for the reception of a stationary tube to be cut, said weighted portion of said cutter support acting by centrifugal force upon rotation of said head to move said cutter means in a direction parallel to said second plane into cutting engagement with a tube positioned in said aperture, said back-up rolls being positioned for engagement by said tube during the cutting operation, means yieldingly opposing movement of said cutter support by said centrifugal force, and stop means to limit movement of said cutter support by the centrifugal action.

2. A tube cutting head structure as set forth in claim 1 including a counterweight fixedly secured in said recess and operable to counterbalance the weighted portion of said cutter support.

3. A tube cutting head structure as set forth in claim 1 wherein said cutter support is movable relative to said body in a direction parallel to said second plane.

4. A tube cutting head structure as set forth in claim 1 wherein said back-up roll supports are co-operable with said cutter support to guide the same during movement thereof.

5. A tube cutting structure as set forth in claim 1 wherein a counterweight is fixedly mounted in said recess at the side of said first plane opposite to said weighted portion of said cutter support.

6. A tube cutting head structure as set forth in claim 1 wherein said cutter is mounted on an arm portion of said cutter support, a counterweight fixedly mounted in said recess, said counterweight being formed with a recess for the reception of said support arm.

7. A tube cutting head structure as set forth in claim 1 and including a counterweight operable to counterbalance the weighted portion of said cutter support, said counterbalance and said cutter support being mounted in said recess in co-planer relationship.

8. A tube cutting head structure as set forth in claim 1 wherein said cutter means consists of a cutter wheel journaled for free rotation upon said support.

* * * * *